(12) United States Patent
Saha et al.

(10) Patent No.: US 6,198,935 B1
(45) Date of Patent: Mar. 6, 2001

(54) SYSTEM AND METHOD FOR TIME OF ARRIVAL POSITIONING MEASUREMENTS BASED UPON NETWORK CHARACTERISTICS

(75) Inventors: Bikash Saha, Plano; Christopher Kingdon, Garland; Bagher Zadeh; Tahir Hussain, both of Dallas, all of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/193,309

(22) Filed: Nov. 17, 1998

(51) Int. Cl.$^7$ .................... H04J 13/02; A01S 3/02
(52) U.S. Cl. ............... 455/456; 455/433; 455/457; 342/457; 342/463; 342/464
(58) Field of Search .................... 455/456, 433, 455/457; 342/463, 457, 464

(56) References Cited

U.S. PATENT DOCUMENTS

| | | | |
|---|---|---|---|
| 5,512,908 | * | 4/1996 | Herrick ........................... 455/456 |
| 5,732,354 | * | 3/1998 | MacDanald ..................... 455/456 |
| 5,815,538 | * | 9/1998 | Grell et al. ..................... 455/456 |
| 5,883,598 | * | 3/1999 | Parl et al. ...................... 455/456 |
| 5,890,068 | * | 3/1999 | Fattouche et al. .............. 455/456 |
| 5,946,619 | * | 8/1999 | Kolev ............................. 455/456 |
| 5,950,137 | * | 9/1999 | Kim ............................... 455/456 |
| 5,983,109 | * | 11/1999 | Montoya ......................... 455/456 |
| 5,987,329 | * | 11/1999 | Yost et al. ...................... 455/456 |
| 6,006,097 | * | 12/1999 | Hornfeldt et al. ................ 455/456 |
| 6,009,091 | * | 12/1999 | Stewart et al. .................. 455/456 |

OTHER PUBLICATIONS

European Telecommunications Standards Institute; "Digital cellular telecommunications system (Phase 2+); Location Services (LCS); (Functional description)—Stage 2 (GSM 03.XX version 0.2.0)" 1997; pp. 1–42.

* cited by examiner

Primary Examiner—Lee Nguyen
Assistant Examiner—Simon Nguyen
(74) Attorney, Agent, or Firm—Jenkens & Gilchrist, P.C.

(57) ABSTRACT

An improved system and method for determining a position of a mobile station in a mobile telecommunications network is disclosed. The system includes a database having geographical information pertaining to the service area of the telecommunications network, including whether service areas therein are characterized as urban areas, suburban areas or "badurban" areas in which radio communication is especially limited. The system further includes a mobile location center (MLC) which, among other things, calculates the number of access signal bursts which are required for transmission by the mobile station to be located. The access burst number is calculated based upon the geographical information pertaining to the service areas stored in the database and upon a requested position determination accuracy. By measuring the time of arrival delay of the burst signal transmission received by two or more base transceiver stations, the MLC computes the position of the mobile station.

24 Claims, 3 Drawing Sheets

SYSTEM AND METHOD FOR TIME OF ARRIVAL POSITIONING MEASUREMENTS BASED UPON NETWORK CHARACTERISTICS

BACKGROUND OF THE INVENTION

1. Technical Field of the Invention

The present invention relates, in general, to the mobile communications field and, particularly, to a system and method for enhanced time of arrival measurements for mobile station positioning utilizing geographical characteristics of the mobile communications network.

2. Background and Objects of the Invention

Mobile radio position determination is an emerging field that has gained a great deal of interest lately, and it is now desirable to include a position determination capability in future cellular mobile radio systems. The Time Difference of Arrival (TDOA) position determination method, which is known from military applications, has been used successfully for determining the position of mobile radio terminals. A typical TDOA position determination system can be either terminal based, whereby Time Of Arrival (TOA) measurements are made on the "downlink" in the mobile station (MS), or network based, whereby the network performs the TOA measurements on the "uplink" in the radio base transceiver stations (BTSs). These TOA measurements are then used to calculate TDOA parameters and estimate the position of the mobile station (MS).

A network-based method for determining the position of cellular mobile stations is disclosed in commonly-assigned Swedish Patent Application No. 9303561-3 to R. Bodin. In order to determine the position of a mobile station, a handover procedure is initiated between a serving base transceiver station and the new base transceiver station. The mobile station transmits access request signals to a new base transceiver station. The base transceiver station measures the time delay for the access request signal to travel between the mobile station and the base transceiver station. This procedure is repeated between the mobile station and one or more additional base transceiver stations. A service node in the cellular network calculates the position of the mobile station by utilizing information about the known positions of the base transceiver stations and the measured access time delays.

This network-based method of determining the position of cellular mobile stations relies on so-called asynchronous handovers, where the target base transceiver stations measure the access delays to the mobile station. Each access delay is used as a measure of the distance between the mobile station and the respective base transceiver station. In specific situations, i.e., MS positioning, a number of BSs may concurrently tune to the same transmitting MS in order to make time delay of arrival measurements between the MS and the BSs. The time delay of the signal transmitted by the mobile station during a handover procedure may be measured by the BSs for use by a processing unit to determine the position of the mobile station. The mobile station transmits signals during the handover operation as a series of bursts.

Although the above-described document illustrates considerable progress in the cellular position determination field, there are still a number of deficiencies to be improved upon. For instance, in existing GSM systems having TOA-based mobile station positioning capabilities, the determination of a mobile station position is not highly accurate. The calculation of the number of access bursts for reception from a mobile station is based upon the type of application and/or the degree of accuracy specified. In addition, the identification of particular time measuring units for use in measuring the time of arrival of transmitted access burst signals is based upon only a general location of the mobile station, such as information gleaned from cell identification and timing advance (TA) parameters. As a result, mobile network resources may not be optimally utilized in determining mobile station position. Network resources in existing GSM systems may be overly utilized to determine mobile station position, thereby reducing the quality of other services provided by the telecommunications system. Alternatively, network resources may be under utilized, resulting in a less accurate mobile station position determination. Consequently, there exists a need for an improved TOA based, mobile station positioning system.

It is an object of the present invention to provide a TOA based positioning system which efficiently and accurately determines the position of a mobile station in a mobile telecommunications network.

It is another object of the present invention to substantially optimally balance accurately determining the position of a mobile station within a mobile telecommunications network against providing wireless speech communication therein.

It is yet another object of the present invention to provide such a system wherein the method of determining the location of a mobile station is based in part upon geographical characteristics of the mobile telecommunications network.

Another object of the present invention is to provide such a system wherein the method determining the location of the mobile station is based upon the location of time measuring units within the mobile telecommunications network.

SUMMARY OF THE INVENTION

The present invention is directed to a system and method for efficiently determining the location of a mobile station within a mobile telecommunications network. The mobile telecommunications network includes at least one mobile switching center (MSC) to which a number of base station systems (BSSS) are communicatively associated to provide conventional wireless telecommunication services. In addition, a mobile location center (MLC) is associated with at least one MSC in the telecommunications network to controls the network's resources in executing a mobile station positioning determination. The system preferably maintains a geographical database of the service area of the telecommunications network. The database identifies portions of the service area having differing radio communication abilities, such as urban areas, suburban areas, and "badurban" areas in which radio communication is especially limited. The MLC preferably accesses the database in managing a mobile station positioning operation.

Each base transceiver station (BTS) is assigned to and communicates with a location measurement unit (LMU), which performs radio measurements for supporting mobile station positioning. Specifically, an LMU is capable of measuring a time of arrival of access burst signals transmitted by the mobile station to be located.

According to the present invention, an application requests a location determination of a particular mobile station from the MLC. Based upon the geographical information maintained in the database and the requested degree of mobile station position accuracy, the MLC computes the number of access bursts necessary for transmission by the mobile station during an asynchronous handover operation. The MLC further computes the number of and identifies the particular LMUs for receiving the burst transmission by the mobile station. The identified LMUs measure the time delay of the burst transmission and transmit the measured time delays to the MLC. Thereafter, the MLC computes the location of the mobile cell and transmits the location computation to the requesting application. Because the calculation of the required burst number and the identification of the participating LMUs for measuring the burst transmission delay is based upon the geographical characteristics of the telecommunications network, network resources are not overused, resulting in less resources for performing other telecommunication services. Network resources are also not under-utilized, resulting in a less accurate determination of the mobile station than requested.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
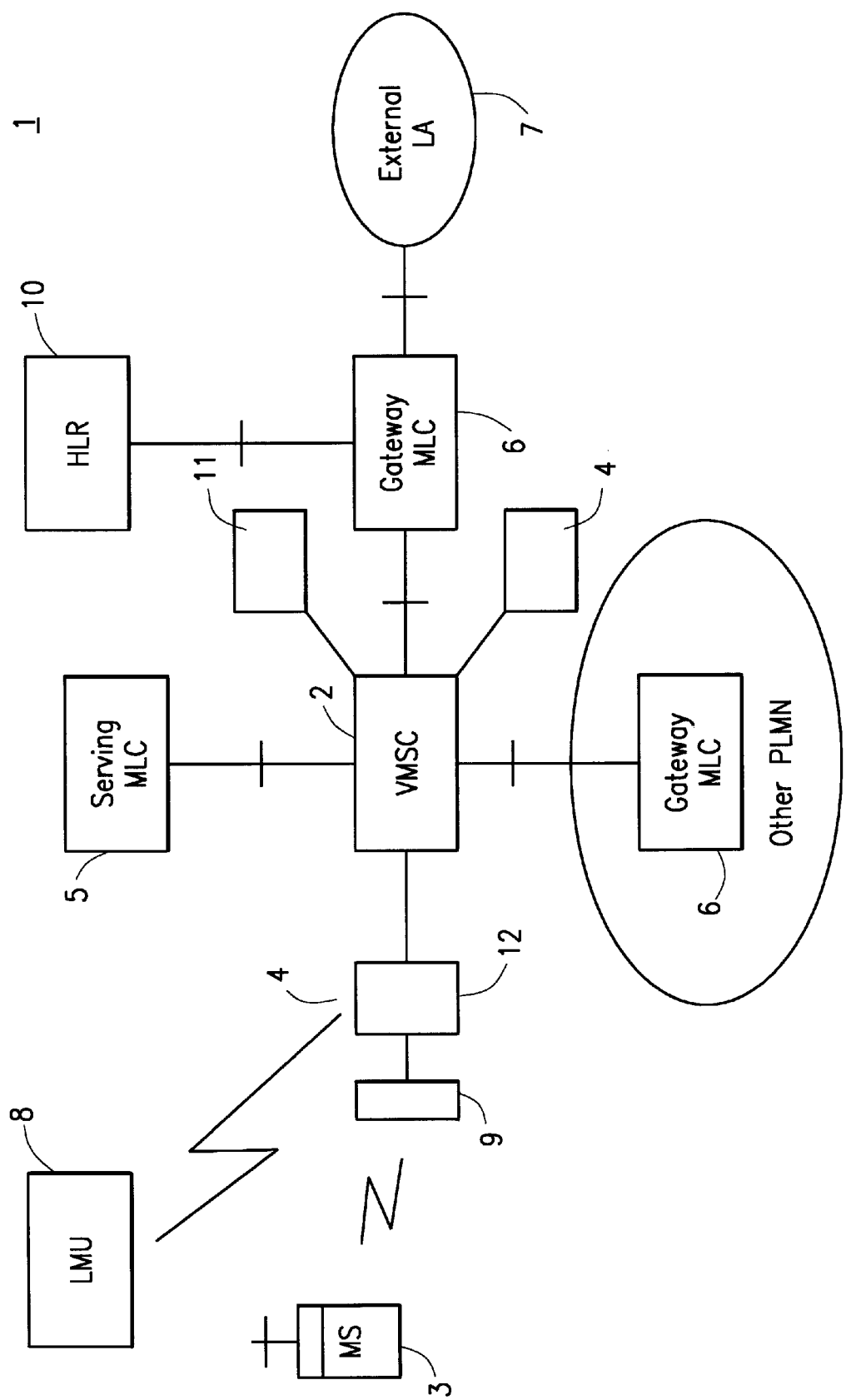
FIG. 1 is a block diagram of a mobile telecommunications system according to the present invention.

Referring to FIG. 1, there is disclosed a mobile telecommunications network 1 according to the present invention. Telecommunications network 1 preferably includes one or more mobile switching centers (MSC) 2 which provides call set-up, routing, control and termination operations in providing telecommunication services to one or more mobile stations 3. The communicative relationship between a base station 4, and particularly base station controller 12, and its corresponding MSC 2 in providing conventional telecommunication services is well known in the art. The MSC 2 may be utilized by a visiting mobile station (MS) 3 as a visiting mobile switching center (VMSC) for receiving telecommunication services.

It is understood that telecommunications network 1 may include a plurality of MSCs 2, each of which communicates with a plurality of base stations 4. Telecommunications network 1 is illustrated in FIG. 1 as having a single MSC 2 for reasons of simplicity.

Telecommunications network 1 preferably further includes a distinct mobile location center (MLC) 5 associated with each MSC 2 in telecommunication network 1. The MLCs 5 are nodes which manage the overall coordination and scheduling of resources within telecommunications network 1 to perform mobile station positioning determinations, as explained below. An MLC 5 in telecommunications network 1 may serve as a gateway mobile location center (GMLC) 6 which an external location area (LA) 7 may access in requesting a determination of a mobile station position. An MLC 5 serving mobile station 3 is referred to as the serving mobile location center (SMLC).

The present telecommunications network 1 preferably further includes a location measurement unit (LMU) 8, a distinct one of which is associated with each base transceiver station (BTS) 9. An LMU 8 preferably communicates with its corresponding base station 4 via the air interface so as to be capable of communicating with MSC 2 and MLC 5. An LMU 8 preferably has its own subscription profile in home location register (HLR) 10 associated with MSC 2. Each LMU 8 performs timing-related, radio signal measurements to support the mobile station position determination feature. The timing-related signal measurements are preferably provided to the particular MLC 5 associated therewith for facilitating MLC 5 in managing the execution of a mobile station position determination, as explained below.

Telecommunications network 1 includes and MLC 5 preferably accesses a database 11 having stored therein geographical information pertaining to network 1. Specifically, database 11 preferably includes knowledge of the surroundings of the cell areas (not shown) served by MSC 5. Based in part upon the cell global identification (CGI) of the served cells, database 11 includes graphical information thereof, such as an indication whether each served cell is an urban cell, a suburban cell or a badurban cell having poor radio communication capabilities. Database 11 preferably further includes the identification and geographical location and/or distribution of each LMU 8 corresponding to the cells served by MSC 2. Database 11 is preferably accessed by a serving MLC 5 in making decisions and/or calculations regarding the determining of the position of a mobile station 3 within the cells served thereby.

In accordance with the present invention, an SMLC 5 performs a number of activities in managing the execution of a mobile station positioning operation. Upon receiving a request to locate a mobile station 3 having a certain degree of accuracy and/or quality of service, SMLC 5 preferably calculates the number of required access bursts for transmission by mobile station 3 during a handover portion of a TOA-based mobile station positioning operation. In addition, SMLC 5 identifies the particular LMUs 8 which are to participate in the mobile station positioning operation. Both the calculation of the required access bursts and the identification of participating LMUs 8 are based upon the cell/service area geographical information stored in database 11 in order to efficiently utilize network resources.

The calculation of the number of required access bursts and the identification of participating LMUs 8 vary depending upon the type of cell/service area the mobile station 3 is located. For example, the number of access bursts required by transmission of a mobile station 3 is typically between 1 and 70. A smaller number of access bursts is necessary to perform a mobile station positioning determination if a mobile station 3 is located within an urban cell area relative to the number of access bursts necessary if the mobile station 3 is located within a badurban cell area. As can be seen, the greater the degree of positioning accuracy requested increases the number of required access bursts as well as the number of participating LMUs 8. By basing the required number of access bursts for mobile station transmission and the identification of participating LMUs 8, network resources are substantially optimally utilized.

Figure 2:
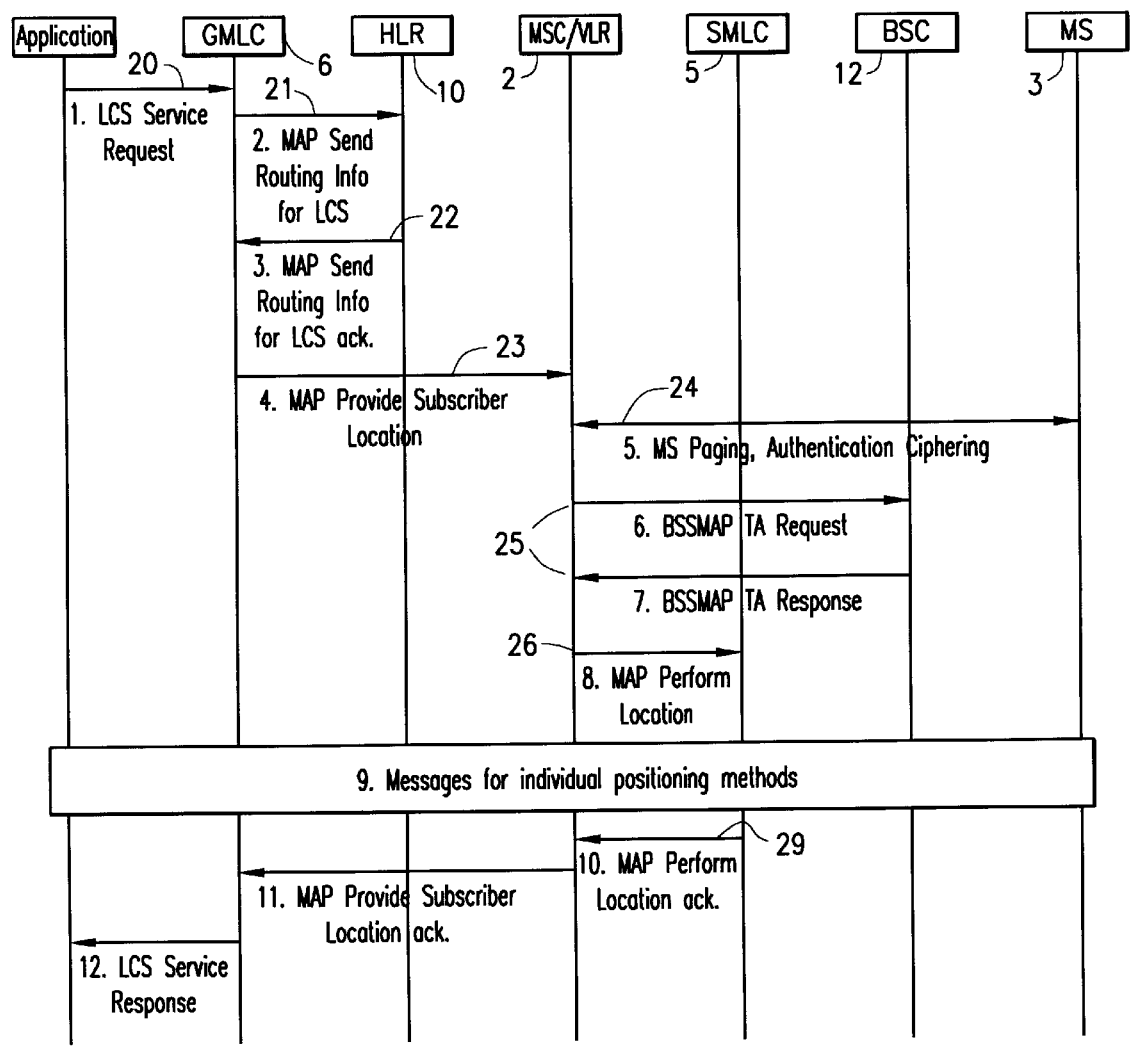
FIG. 2 is an event chronology of a mobile station positioning operation in conjunction with the present invention.

The method of determining a position of a mobile station within telecommunications network 1 will be described with reference to FIGS. 2 and 3. Initially, an application requests a mobile station position determination from a GMLC 6. GMLC 6 responds to the request by verifying the identity of the application and that the application is a subscriber to the mobile station position service. Upon proper application verification and, assuming that the international mobile subscriber identity (IMSI) and the MSC 2 serving the mobile station 3 to be located are not known, GMLC 6 sends a request for routing information to the HLR 10 serving mobile station 3 at step 21. In response thereto, HLR 10 returns the address of the serving MSC 2 and the IMSI for mobile station 3 at step 22.

Upon receiving the address of the serving MSC 2, GMLC 6 sends a message to the serving MSC 2 at step 23 which informs MSC 2 of the position request. The message includes service related parameters specified by the requesting application, including accuracy, response time, preferred/required positioning method and an indication whether the application has an override capability. Upon receiving the message from GMLC 6, the serving MSC 2 may verify that mobile station 3 does not bar a position determining service thereon by MSC 2 accessing the subscriber's profile. If a position determining service is barred by mobile station 3 but the requesting application possesses an override capability or if the service is not barred, the mobile station positioning determination continues by the serving MSC 2 and/or corresponding VLR (not shown) performing paging, authentication and ciphering to mobile station 3 if mobile station 3 is idle (step 24). In response thereto, mobile station 3 provides its current cell identification and timing advance (TA) value. Alternatively, if mobile station 3 is in a dedicated mode, the serving MSC 2 is supplied with the current cell identification from either BSC 12 or another MSC 2 in the event an MSC-MSC handover is in progress (step 25).

The serving MSC 2 then sends a request message to perform a location determination to the serving MLC 5 associated with the current cell of mobile station 3 (step 26). The request may include the service related parameters (accuracy, etc.) specified by the requesting application as well as the current cell identification and TA value of mobile station 3.

Figure 3:
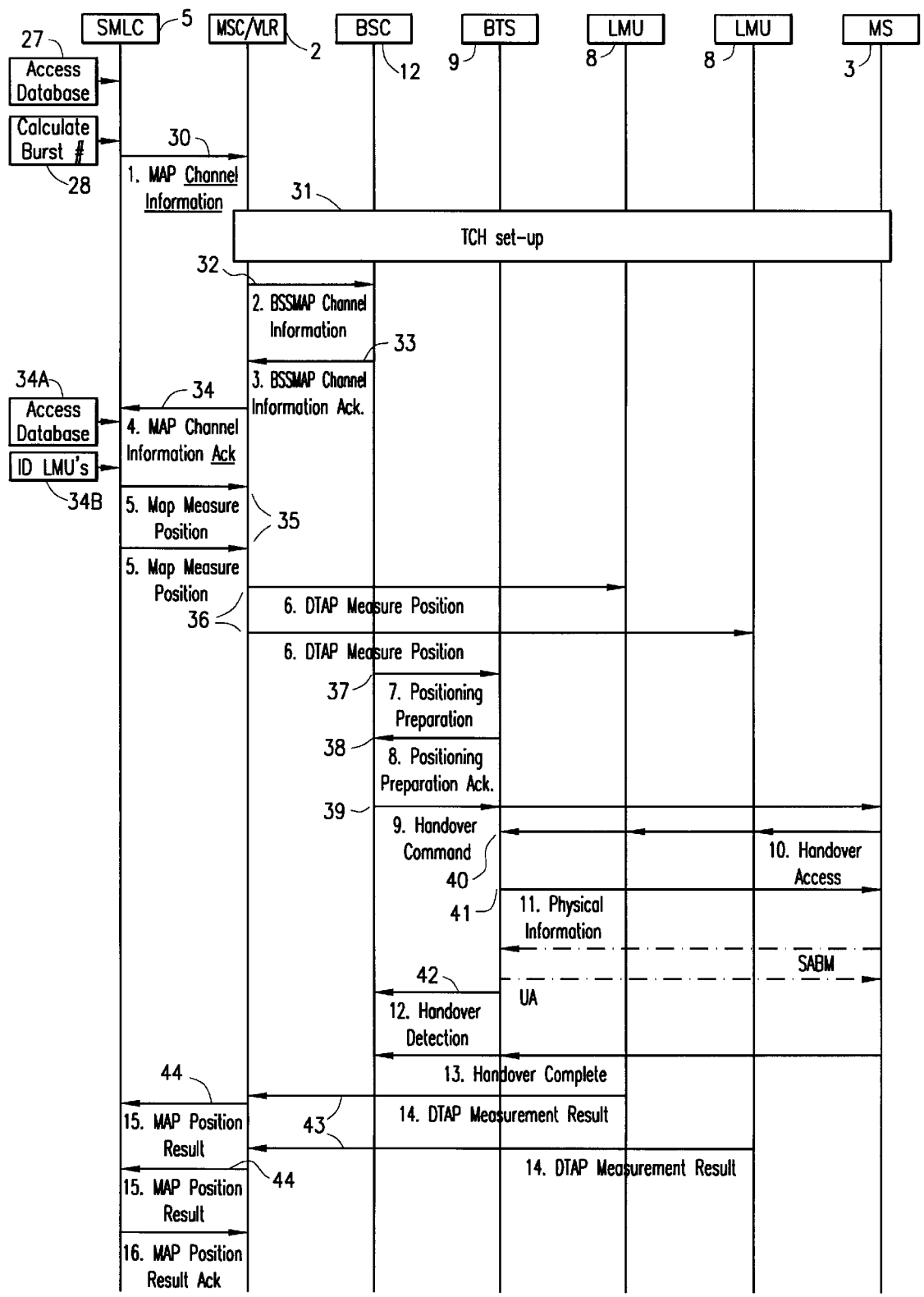
FIG. 3 is an event chronology of the TOA-based positioning procedure for executing a mobile station positioning operation in conjunction with the present invention.

Referring now to FIG. 3, upon receiving the request message to perform the position determination for mobile station 3, the serving MLC 5 retrieves from database 11 geographical information pertaining to the general area in which mobile station 3 is located (step 27). Thereafter, the serving MLC 5 calculates the number of access burst transmissions required by mobile station 3, and calculates a timer value for base station(s) 4 (step 28). The serving MLC 5 additionally determines the TDMA frame number. The serving MLC 5 performs the calculations and determinations based upon the cell/service area geographical characteristics retrieved from database 11 and upon the information received by the serving MSC 2 in step 26.

For example, if the general area in which mobile station 3 is located is characterized as an urban area in database 11, then a relatively smaller number of access bursts will be required and calculated in step 28. Alternatively, if the general area in which mobile station 3 is located is characterized as a badurban area in database 11, then a relatively larger number of access bursts will be required.

Next, the serving MLC 5 then transmits a channel information message to the serving MSC 2 (and any other MSC 2 which is necessary to perform the position determination) at step 30 having therein the required number of burst signals, the determined TDMA frame number, the base station timer value and an indication that TOA positioning will be utilized. In response thereto, a traffic channel is set up in the event mobile station 3 is idle (step 31).

Next, MSC 2 transmits a channel information message to the appropriate BSC(s) 12, requesting the physical channel description of the allocated traffic channel (step 32). The channel information message may also contain the determined TDMA frame number, the number of expected mobile station access bursts and the calculated base station timer value. The BSCs 12 initiate a base station timer (not shown) at this time. In response to receiving the channel information message from MSC 2, the BSCs 12 specify the physical channel description, the CGI, and TA measurement result, and transmits an acknowledgment message to MSC 2 at step 33. Subsequent thereto, MSC 2 transmits a channel information acknowledgment message to the serving MLC 5 having therein the physical channel description (step 34). The serving MLC 5 uses the physical channel information in configuring LMUs 8.

At this point, the serving MLC 5 retrieves geographical information from database 11 (step 34A) and identifies the LMUS 8 for participating in the mobile station position determination (step 34B) based upon the geographical information retrieved from database 11 (radio environment information and LMU distribution information). MLC 5 then transmits a measurement configuration messages for each of the identified LMUs 8 to MSC 2 (step 35). The configuration message specifies the physical channel, LMU identification, TDMA frame number for the handover operation portion of the position determining service, the number of expected access bursts by mobile station 3, and the starting time and measurement window for the expected access bursts. In response thereto and assuming a DTAP connection is already established, MSC 2 converts the configuration message from the serving MLC 5 into a DTAP message for reception by the identified LMUs 8 over the air interface (step 36).

Upon expiration of the base station timer, base station controller 12 of base station 4 forwards the corresponding BTSs 9 a positioning preparation message having the number of expected access bursts from mobile station 3 during execution of a handover operation (step 37). The BTSs 9 respond by transmitting a positioning preparation acknowledgment signal to their respective BSCs 12 (step 38).

Thereafter, base station controller 12 sends a handover command to mobile station 3 at step 39. The command includes the TDMA frame number at which the transmission of access bursts should begin. Mobile station 3 commences transmitting access bursts in a handover access message at step 40. The identified LMUs 8, already configured for receiving the burst signal transmission, measure the time of arrival thereof.

When LMUs 8 have received the required number of access bursts, the BTSs 9 corresponding thereto sends a physical information message to mobile station 3 at step 41 requesting mobile station 3 discontinue transmitting burst signals. It is noted that in the event mobile station 3 fails to receive a request to discontinue the burst transmission, a timeout condition occurs which discontinues the transmission. Next, the BTSs 9 transmit a handover detection message to their respective BSCs 12 to indicate that the required number of access bursts have been received on the allocated channel (step 42). Mobile station 3 sends a handover complete message to BSC(s) 12. This triggers base station(s) 4 to switch paths from the old channel to the new channel. However, it is noted that in the mobile station positioning determination feature, the old channel is the same as the new channel when executing the handover command thereof.

Next, LMUs 8 report their timing measurement results in a DTAP message to MSC 2 (step 43), which is thereupon routed to the serving MLC 5 as a MAP message (step 44). At this point, the serving MLC 5 computes a position for mobile station 3 based upon the reported measurement results.

Referring again to FIG. 2, once the serving MLC 5 computes the position for mobile station 3, the serving MLC 5 transmits a MAP perform location acknowledge signal to MSC 2 (step 29). In response thereto, MSC 2 forwards the position information to the GMLC 6, whereupon the position information is forwarded to the requesting application.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for determining a position of a mobile station within a mobile telecommunications network, comprising the steps of:
   maintaining a database having stored therein geographical information pertaining to service areas within the mobile telecommunications network, the geographical information including an ability to perform radio communication within the service areas;
   calculating a required number of access burst signals for transmission by the mobile station to be used to determine the position of the mobile station, the calculation occurring prior to transmission of the access burst signals by the mobile station and being based upon the geographical information pertaining to the service areas;
   receiving the required number of access burst signals transmitted by the mobile station;
   measuring the time of arrival of the required number of access burst signals transmitted by the mobile station during the receiving step; and
   calculating a position of the mobile station within the telecommunications network based upon the time of arrival measurements of the required burst signal transmission.

2. The method of claim 1, further including the step of:
   identifying a plurality of base transceiver stations in the telecommunications network for participating in performing the mobile station position determination based upon the geographical information pertaining to the service areas;
   wherein the identified participating base stations receive the required number of access burst signals transmitted by the mobile station.

3. The method of claim 2, wherein:
   the service area geographical information includes an indication of the location of time measuring units associated with the base transceiver stations in the telecommunications network; and
   the base transceiver station identifying step identifies the participating base transceiver stations based upon the time measuring unit locations in the service area geographical information.

4. The method of claim 1, wherein:
   the geographical information pertaining to the service areas includes an indication whether service areas in the telecommunications network are one of an urban area, suburban area and badurban area in which radio communication is limited relative to radio communication in urban areas and suburban areas.

5. The method of claim 4, wherein:
   the required number of access burst signals for transmission by the mobile station is calculated based upon whether a general location of the mobile station is characterized as an urban area, suburban area or badurban area.

6. The method of claim 1, further including the step of:
   receiving a request to perform a position determination of the mobile station prior to the calculating step, the request including a requested degree of accuracy for the position determination; and
   the calculating step calculates the required number of access bursts based upon the requested degree of positioning accuracy.

7. The method of claim 1, further including the step of:
   transmitting a message to the mobile station to discontinue transmission of burst signals following the burst signal number receiving step.

8. The method of claim 1, wherein:
   the access burst signals comprise part of a cell handover operation.

9. A mobile telecommunications network, comprising:
   at least one mobile switching center (MSC);
   a database having stored therein cell area geographical information of the cell areas which indicate an ability to perform radio communication therein;
   a mobile location center (MLC) associated with the MSC, for calculating a number of burst signals for transmission by a mobile station to be used to determine a position thereof based upon the cell area geographical information;
   wherein the MLC receives measured time of arrival delays of the burst signals transmitted by the mobile station and measured by location measurement units (LMUs) in the mobile telecommunications network, and calculates a position of the mobile station based upon the measured time of arrival delays of the burst signal transmission.

10. The telecommunications network of claim 9, wherein:
    the cell area geographical information includes an indication whether cell areas in the telecommunications network are urban cell areas, suburban cell areas or badurban cell areas having a reduced ability for radio communication relative to the urban cell area and the suburban cell area.

11. The telecommunications network of claim 10, wherein:
    the number of burst signals for transmission by the mobile station to be used to determine a position thereof is based upon whether the cell area of the mobile station is identified in the database as an urban cell area, a suburban cell area or a badurban cell area.

12. The telecommunications network of claim 9, wherein:
    the MLC identifies LMUs for measuring the burst signal transmission based upon the cell area geographical database information.

13. The telecommunications network of claim 9, wherein:
    the MLC calculates the number of burst signals based upon a predefined degree of accuracy of the mobile station position determination.

14. The telecommunications network of claim 9, wherein:
the cell area geographical database information includes an indication of the location of the LMUs in the telecommunications network; and
the MLC identifies certain LMUs for measuring the burst signal transmission based upon the LMU location indications in the cell area geographical database.

15. The telecommunications network of claim 14, wherein:
the LMUs instruct the mobile station to discontinue transmitting the burst signals upon the LMUs receiving the calculated number of burst signals.

16. A method for determining a position of a mobile station within a mobile telecommunications network, comprising the steps of:
receiving a request to perform a position determination of the mobile station, the request including a requested degree of accuracy for the position determination;
calculating a required number of access burst signals for reception from the mobile station based upon the requested degree of accuracy for the position determination;
receiving the required number of access burst signals transmitted by the mobile station;
measuring the time of arrival of the required number of access burst signals transmitted by the mobile station during the receiving step; and
calculating a position of the mobile station within the telecommunications network based upon the time of arrival measurements of the required burst signal transmission.

17. The method of claim 16, further including the step of:
maintaining a database of geographical information pertaining to cell areas within the mobile telecommunications network, the geographical cell area information including an indication of an ability to perform radio communication in the cell areas; and
the calculating step calculates the required number of access burst signals received from the mobile station based upon the geographical cell area information.

18. The method of claim 17, wherein:
the indication of an ability to perform radio communication within the cell areas includes an indication of whether each cell area is characterized as one of an urban cell area, a suburban cell area and a badurban cell area having a reduced ability to perform radio communication.

19. The method of claim 17, further including the step of:
identifying one or more base transceiver stations within the telecommunications network for receiving the required number of access burst signals during the access burst signal receiving step, the identifying of the base transceiver stations being based upon the geographical cell area information.

20. The method of claim 16, further including the step of:
instructing the mobile station to discontinue transmitting burst signals following the burst signal receiving step.

21. A device for determining a position of a mobile station within a mobile telecommunications system providing telecommunication services throughout a service area, comprising:
a database having information pertaining to the service area, including information thereof indicating an ability to perform radio communication in the service area; and
a control means for calculating a duration of one or more signals to be transmitted by the mobile station, the calculating occurring prior to transmission of the one or more signals by the mobile station and the calculated signal duration being based upon the information indicating the ability to perform radio communication within a portion of the service area where the mobile station is located, receiving signal measurement information of the one or more signals transmitted by the mobile station, and calculating a position of the mobile station based upon the signal measurement information.

22. The device of claim 21, further including:
a means for receiving a request for determining the position of the mobile station, including a requested degree of accuracy for the mobile station position determination; and
the calculated duration of the signal is based upon the requested degree of accuracy for the mobile station position determination.

23. The device of claim 21, wherein:
the indication of the ability to perform radio communication within the portion of the service area includes an indication whether the portion of the service area is one of an urban area, a suburban area and a badurban area having a lesser ability to perform radio communication.

24. The device of claim 21, wherein:
the mobile telecommunications system includes a plurality of base transceiver stations; and
the control means identifies one or more of the base transceiver stations for receiving the signal transmitted by the mobile station, the base transceiver station identification being based upon the indication of the ability to perform radio communication within the portion of the service area where the mobile station is located.

* * * * *